(12) United States Patent
Foreman et al.

(10) Patent No.: US 12,065,306 B1
(45) Date of Patent: Aug. 20, 2024

(54) COVERED DUMPSTER AND PORTABLE TOILET SYSTEM

(71) Applicants: Richard P. Foreman, Stillwater, MN (US); Christopher R. Foreman, Stillwater, MN (US)

(72) Inventors: Richard P. Foreman, Stillwater, MN (US); Christopher R. Foreman, Stillwater, MN (US)

( * ) Notice: Subject to any disclaimer, the term of this patent is extended or adjusted under 35 U.S.C. 154(b) by 0 days.

(21) Appl. No.: 18/612,490

(22) Filed: Mar. 21, 2024

Related U.S. Application Data (60) Provisional application No. 63/495,018, filed on Apr. 7, 2023.

(51) Int. Cl.
   B65F 1/00 (2006.01)
   E04H 1/12 (2006.01)

(52) U.S. Cl.
   CPC .......... B65F 1/0053 (2013.01); E04H 1/1216 (2013.01)

(58) Field of Classification Search
   CPC ...... B65F 1/0053; B65F 1/006; B65F 1/1452; B65F 2003/006; B65F 2003/008; E04H 1/1216; B60P 1/286
   USPC .............................. 4/300, 449, 458, 460, 476
   See application file for complete search history.

(56) References Cited

U.S. PATENT DOCUMENTS

| | | | |
|---|---|---|---|
| 3,992,727 A | 11/1976 | Elkins | |
| 4,625,810 A | 10/1986 | Conner | |
| 4,751,753 A | 6/1988 | Sargent et al. | |
| 5,158,198 A * | 10/1992 | Melideo | B65D 88/126 220/908 |
| 5,183,283 A | 2/1993 | Jarlsson | |
| 5,256,378 A | 10/1993 | Elston | |
| 5,548,856 A | 8/1996 | Julian | |
| 5,781,940 A | 7/1998 | Becker et al. | |
| 6,723,173 B1 | 4/2004 | Golladay | |
| 7,966,675 B2 | 6/2011 | Matejka | |
| 8,927,265 B2 | 1/2015 | Hansen et al. | |
| 2016/0130827 A1 | 5/2016 | Matejka | |
| 2023/0373374 A1 * | 11/2023 | Marino | B60P 1/6463 |

* cited by examiner

*Primary Examiner* — Tuan N Nguyen
(74) *Attorney, Agent, or Firm* — Merchant & Gould P.C.

(57) ABSTRACT

A waste removal system featuring sidewall extensions designed to bridge a height differential between a dumpster portion and an integrated portable toilet housing, ensuring secure waste containment. Mounted on a chassis, the system comprises a dumpster portion and a toilet housing portion for a portable toilet, with the portable toilet housing's elevation creating a height differential between a dumpster portion and the portable toilet housing. The sidewall extensions attached to the sides of the dumpster portion, effectively filling the void caused by the height disparity, and redefining the dumpster portion's top opening for improved containment. An advanced roll-off tarp system, with a spool and lever arm mechanism, facilitates the deployment of a tarp large enough to cover both portable toilet housing and the top opening of the dumpster portion, ensuring the system's contents are securely covered during transport, thereby enhancing site cleanliness and regulatory compliance.

10 Claims, 9 Drawing Sheets

FIG. 9

COVERED DUMPSTER AND PORTABLE TOILET SYSTEM

CROSS-REFERENCE TO RELATED APPLICATIONS

This application claims the benefit of U.S. Provisional Application No. 63/495,018, filed Apr. 7, 2023, and titled "DUMPSTER SIDEWALL EXTENSION" the disclosure of which is hereby incorporated herein by reference.

TECHNICAL FIELD

The present disclosure relates generally to waste collection systems, and more particularly to a combined waste collection and sanitation system incorporating a dumpster and portable toilet unit with integrated sidewall extensions and a roll-off tarp coverage mechanism.

BACKGROUND

A combination roll-off dumpster with a portable toilet, sometimes referred to as a combination dumpster, can be particularly useful on construction sites and renovation projects, where both waste disposal and sanitation facilities are needed. The combination dumpster integrates a portable restroom with a standard roll-off dumpster, providing a two-in-one solution that saves space and offers convenience to workers on the site. One example of a combination roll-off dumpster with a portable toilet is disclosed in U.S. Pat. No. 7,966,675, filed Mar. 18, 2007, the contents of which are incorporated by reference herein in their entirety.

During transport both the portable toilet and the roll-off dumpster are covered with a tarp, typically extending from front to back. The problem, however, is that the top of the portable toilet typically extends about two to three feet higher than the top edge of the walls surrounding the roll-off dumpster enclosure. Accordingly, when the tarp is stretched from front to back a large triangular void or opening is present on the sides, between tarp and the top edge of the roll-off dumpster wall potentially allowing debris and litter to escape during transit. The need to address this potential containment issue is not only a matter of maintaining cleanliness and safety standards during transport, but also a regulatory requirement.

SUMMARY

Embodiments described herein can provide a combined waste removal and sanitation solution, and may incorporate various aspects as disclosed herein in any combination. In one aspect, a chassis forms the foundational support for a combined dumpster and portable toilet system, enhancing structural integrity and mobility. In one aspect, an enclosure attached to the chassis serves as a refuse collection area, designed to efficiently gather and contain waste materials. In one aspect, the system features a raised toilet housing portion on the chassis, specifically configured to accommodate a portable toilet, thereby addressing the need for accessible sanitation facilities.

In one aspect, the design includes a pair of right triangular sidewall extensions on both sides of the dumpster portion, effectively filling the gap created by the height differential between the dumpster portion and the toilet housing portion, which redefines the top opening of the dumpster for improved waste containment. In one aspect, an roll-off tarp system, equipped with a spool mounted at the front, allows a tarp to extend over the top of the toilet housing portion and the top opening of the dumpster, ensuring complete coverage and securement of contents during transport.

In one aspect, the sidewall extensions are constructed from expanded gauge metal, affixed to an angle iron frame, providing robust durability and resistance to the harsh conditions of construction environments. In one aspect, the frames are securely bolted to the top edge of the dumpster portion, offering a stable and reliable attachment point for the sidewall extensions. In one aspect, the sidewall extensions are designed to be detachable, allowing for adaptable use based on varying requirements of waste containment and transport.

In one aspect, the system incorporates hooks or anchors on the sidewall extensions, which are designed to engage with corresponding fasteners on the tarp, thus ensuring a secure fit and comprehensive coverage when the tarp is extended. In one aspect, a motorized lever arm mechanism is included to automate the extension and retraction of the tarp, significantly enhancing operational efficiency and safety.

In one aspect, the system is designed to integrate with a transportation vehicle equipped with a hoist mechanism, facilitating easy loading and unloading of the dumpster and portable toilet system, even when fully tarped. In one aspect, the chassis is additionally equipped with rollers or casters, providing enhanced mobility for the system, allowing for precise positioning or relocation as required by the specifics of the work site.

Embodiments of the present disclosure provide a mobile sanitation and waste containment unit including a unified structure that includes: a base frame; a refuse container fixed to the base frame, featuring a compartment for waste collection with an open top for depositing waste material; a sanitation module affixed to the base frame, equipped with a compartment designed to accommodate a portable lavatory unit, wherein the sanitation module is positioned at a higher elevation compared to the refuse container, resulting in a vertical disparity; dual sloped extensions, each configured as a right-angled triangle, securely mounted on either side of the refuse container, where each extension's height aligns with the vertical disparity and its length runs parallel to the refuse container's side, effectively bridging the gap caused by the elevation difference and reconfiguring the refuse container's upper boundary; and an automated covering mechanism, including a reel positioned at the front of the unified structure; a flexible cover coiled around the reel, dimensioned to span across the sanitation module's peak and the newly formed upper boundary of the refuse container established by the sloped extensions; and an articulated arm system linked to the reel, engineered to unfurl the cover across the sanitation module and refuse container, ensuring complete enclosure from the front end to the back end.

In one aspect, each sidewall extension comprises an expanded gauge metal wall. In one aspect, each sidewall extension comprises an angle iron frame. In one aspect, the angle iron frame of each sidewall extension is bolted to a top edge of the dumpster portion. In one aspect, the pair of triangular sidewall extensions are detachable, allowing for their removal and attachment as required.

In one aspect, the pair of triangular sidewall extensions includes a plurality of hooks or anchors, designed to engage with corresponding fasteners on the tarp, ensuring a secure fit and full coverage when the tarp is extended. In one aspect, the lever arm mechanism includes a motorized actuator to automate the extension and retraction of the tarp.

In one aspect, the mobile sanitation and waste containment unit further includes a transportation vehicle including a hoist mechanism for engaging the dumpster and portable toilet system, facilitating the placement of the system onto the transportation vehicle and the removal of the system from the transportation vehicle, wherein the hoist mechanism is adapted to operate with the dumpster and portable toilet system when the tarp is extended over the system by the roll-off tarp system.

In one aspect, the chassis further comprises rollers or casters mounted thereto for positioning or moving the dumpster and portable toilet system. In one aspect, the portable toilet is at least one of removable mounted in the toilet housing portion or integrally fabricated in the toilet housing portion.

Yet another embodiment of the present disclosure provides a waste removal system comprising: a dumpster and portable toilet system comprising: a chassis; a dumpster portion attached to the chassis, wherein the dumpster portion includes an enclosure adapted for receiving refuse; a toilet housing portion attached to the chassis, wherein the toilet housing portion includes a recess adapted to receive a portable toilet, the toilet housing portion extending above a height of the dumpster portion creating a height differential between the dumpster portion and the toilet housing portion; and a roll-off tarp system comprising: a spool mounted anterior to the dumpster and portable toilet system; a tarp wound around the spool, the tarp defining a window shaped and sized to enable a portion of the toilet housing portion to pass therethrough, while a remainder of the tarp rests substantially flat atop a top opening of the dumpster portion, and; a lever arm mechanism connected to the spool, adapted to extend the tarp from the spool, over the toilet housing portion and dumpster portion, from front to back.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
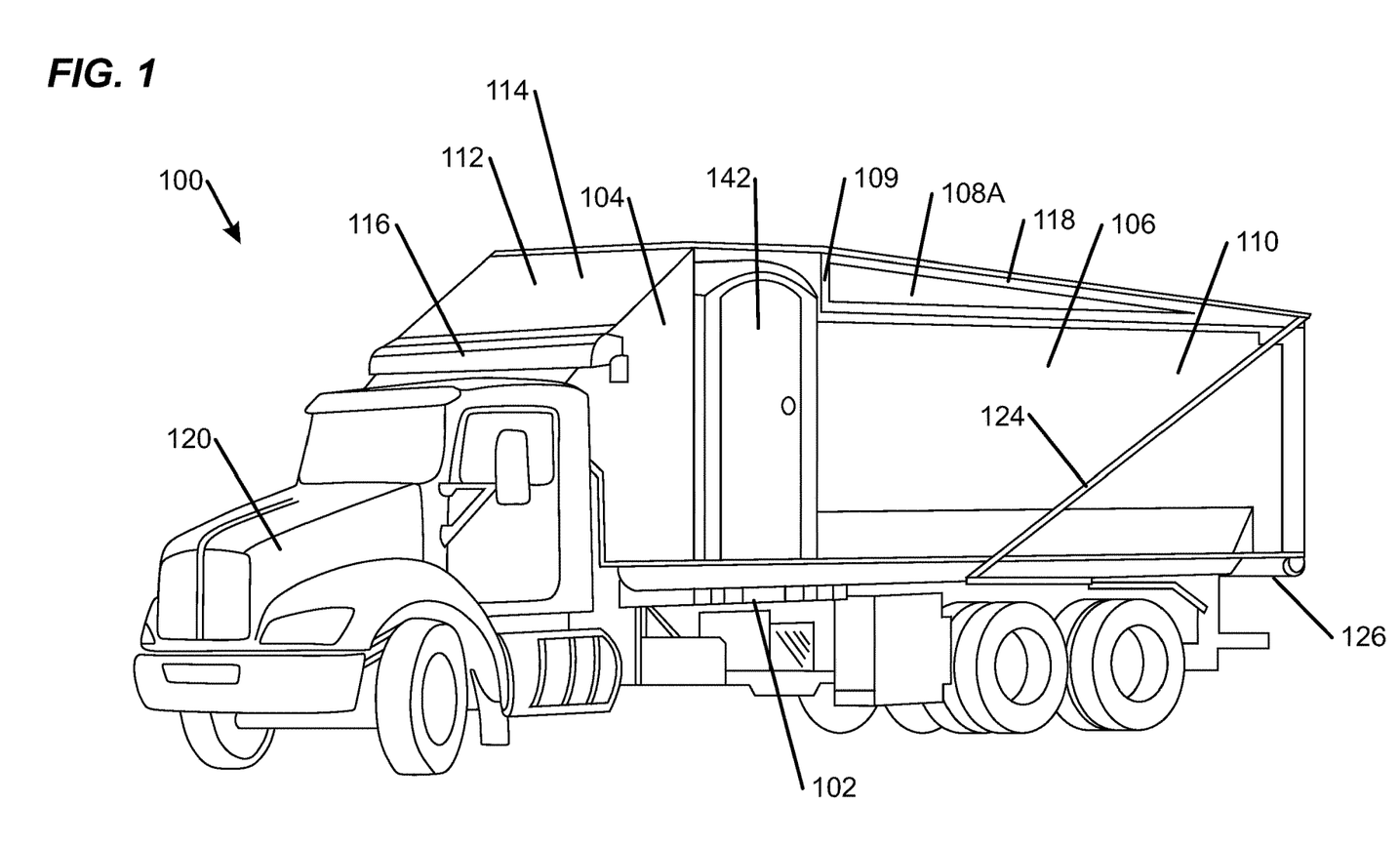
FIG. 1 is a perspective view of a waste removal system in a covered configuration, in accordance with an embodiment of the disclosure.
Figure 2:
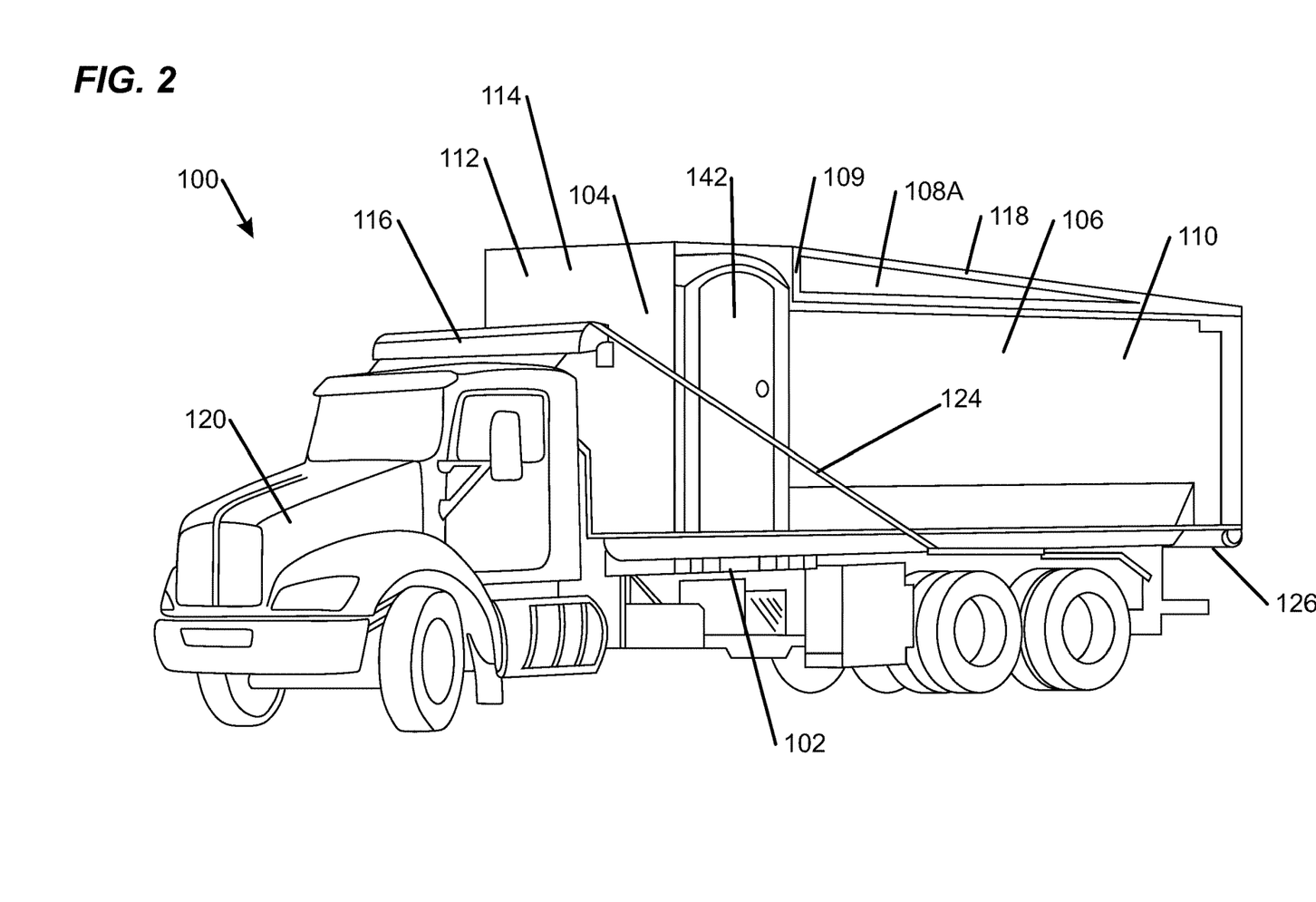
FIG. 2 is a perspective view of the waste removal system of FIG. 1 in an uncovered configuration.

Referring to FIGS. 1-2, a waste removal system 100 is depicted in accordance with embodiment of the disclosure. The waste removal system 100 generally includes a chassis 102 supporting a toilet housing portion 104 and a dumpster portion 106, with a pair of side wall extensions 108A, 108B attached to respective sides of the dumpster portion 106, wherein each sidewall extension has a triangular shape with a vertical side 109 corresponding to a height differential between the toilet housing portion and the dumpster portion, so as to fill a void created by the height differential.

The pair of sidewall extensions 108A, 108B can generally serve to extend the height of the sides of the dumpster portion to match that of the toilet housing portion 104, to ensure that waste remains contained within the dumpster portion 106, even when the dumpster portion 106 is filled to a level that is flush with the top of the toilet housing portion 104.

Figure 7:
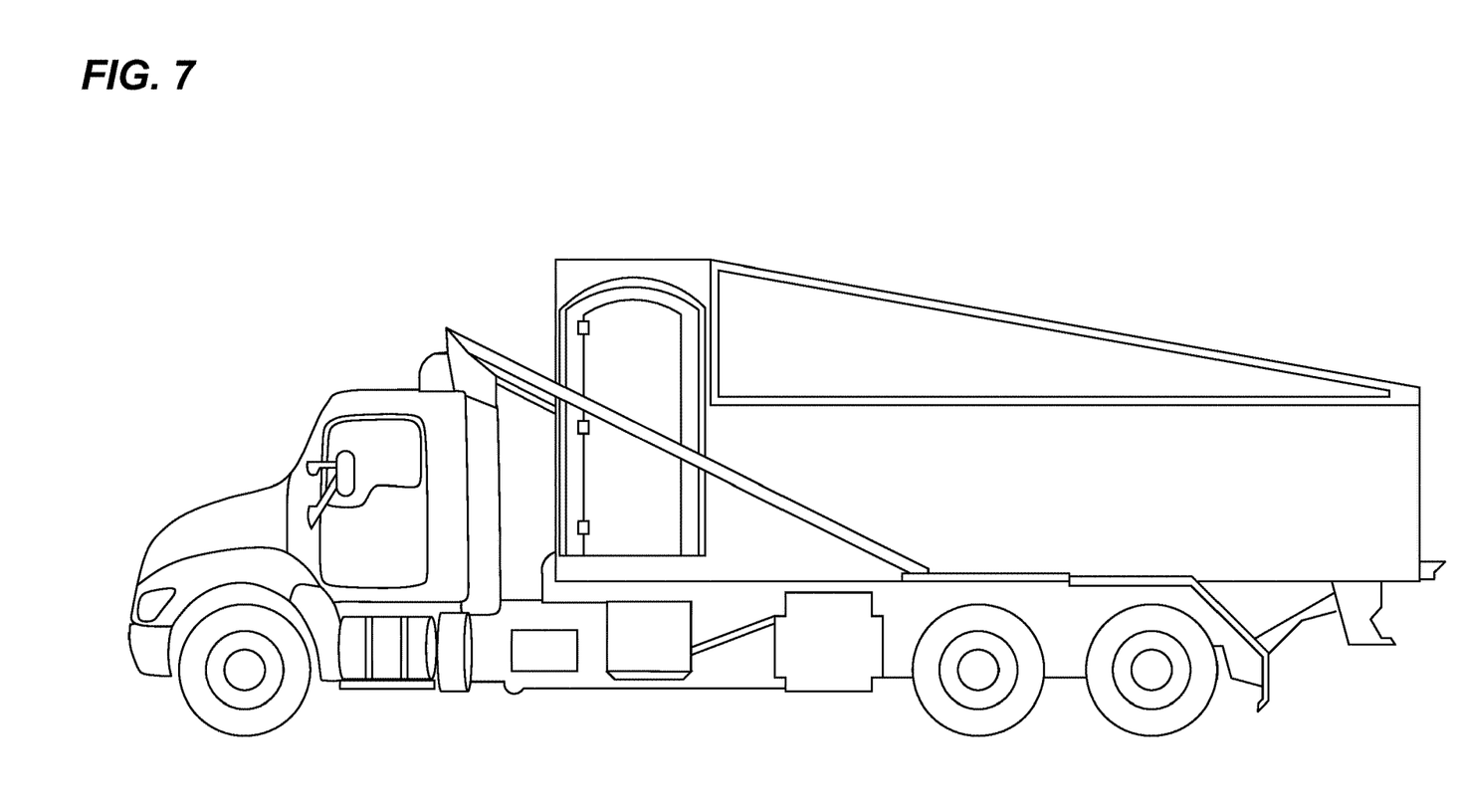
FIG. 7 is a perspective view of a 20 cubic yard waste removal system, in accordance with an embodiment of the disclosure.

Additionally, the pair of sidewall extensions 108A, 108B generally serve to increase the cubic volume of the dumpster portion 106. In some embodiments, the dumpster portion 106 (without the sidewall extensions 108A, 108B) has a capacity of about 30 yards (as depicted in FIGS. 1-3 and 5) or 20 yards (as depicted in FIG. 7). In some embodiments, the pair of sidewall extensions 108A, 108B serve to increase the cubic volume of the dumpster portion 106 by at least 10 percent. In other embodiments, the cubic volume of the dumpster portion 106 can be increased by between about 10 percent and about 25 percent.

Collectively the chassis 102, toilet housing portion 104, dumpster portion 106 and sidewall extensions 108A, 108B can form a combination dumpster 110. As further depicted in FIGS. 1-2, in some embodiments, the waste removal system 100 can additionally include a transportation vehicle 120 onto which the combination dumpster may be removably placed. In one embodiments, the transportation vehicle 120 may be a conventional truck. Alternatively, the transportation vehicle 120 can be a trailer.

Figure 3:
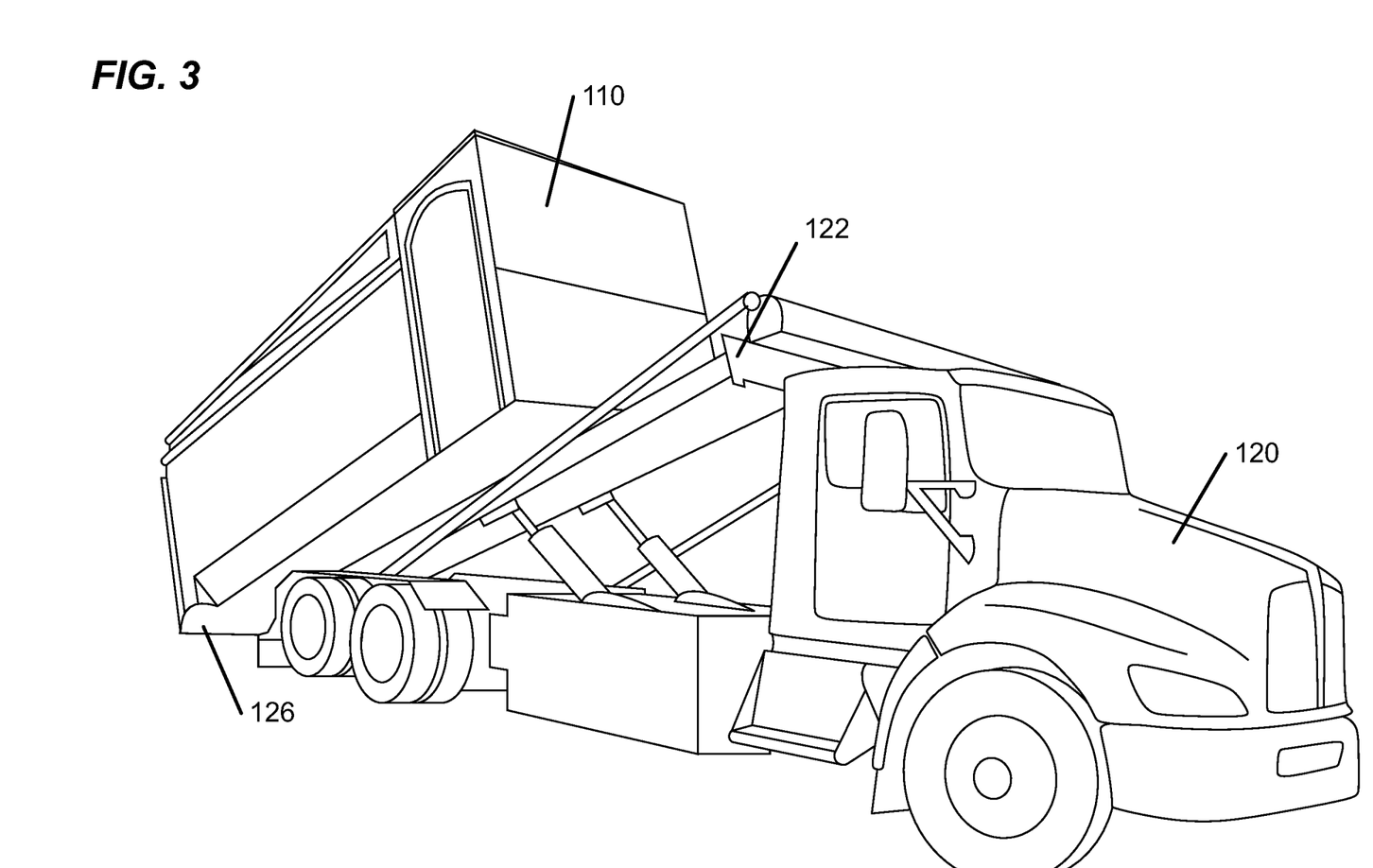
FIG. 3 is a perspective view of the waste removal system of FIG. 1 being offloaded from a transport vehicle via a hoist a mechanism.

As further depicted in FIG. 3, the combination dumpster 110 can be placed onto and removed from the transportation vehicle 120 using a sliding motion with a hoist mechanism 122. The use of variety of hoist mechanisms 122 for placing the combination dumpster 110 onto the transportation vehicle 120, such as a cable and a hook, is contemplated.

With continued reference to FIGS. 1-2, in some embodiments, the waste removal system 100 is further enhanced by the inclusion of a roll-off tarp system 112 including a tarp 114, configured to secure a top opening 118 of the dumpster portion 106. In embodiments, the roll-off tarp system 112 can include a spool 116, which can be mounted anterior to the combination dumpster 110. For example, in some embodiments, the spool 116 can be mounted to a cab or other portion of the transportation vehicle 120.

For storage in the uncovered position (as depicted in FIG. 2), the tarp 114 can be wound around the spool 116. Conversely, in the covered position (as depicted in FIG. 1), the tarp 114 can be unwound from the spool 116 to extend over the top opening 118 of the dumpster portion 106 defined by the pair of triangular sidewall extensions 108A, 108B, thereby serving as a cover for the top opening 118 of the dumpster portion 106 defined by the pair of triangular sidewall extensions 108A, 108B.

In embodiments, the roll-off tarp system 112 can further include a lever arm mechanism 124 connected to the spool 116 and adapted to pull the tarp 114 from the spool 116 when transitioning from the uncovered position to the covered position, and to aid in the retraction of the tarp 114 to be re-rolled on the spool 116 when transitioning from the covered position to the uncovered position. In some embodiments, the lever arm mechanism 124 can be coupled to a pivot on the transportation vehicle 120, thereby enabling the lever arm mechanism 124 to pivot relative to the combination dumpster. In some embodiments, the lever arm mechanism 124 includes a motorized actuator to automate the extension and retraction of the tarp 114.

Figure 4:
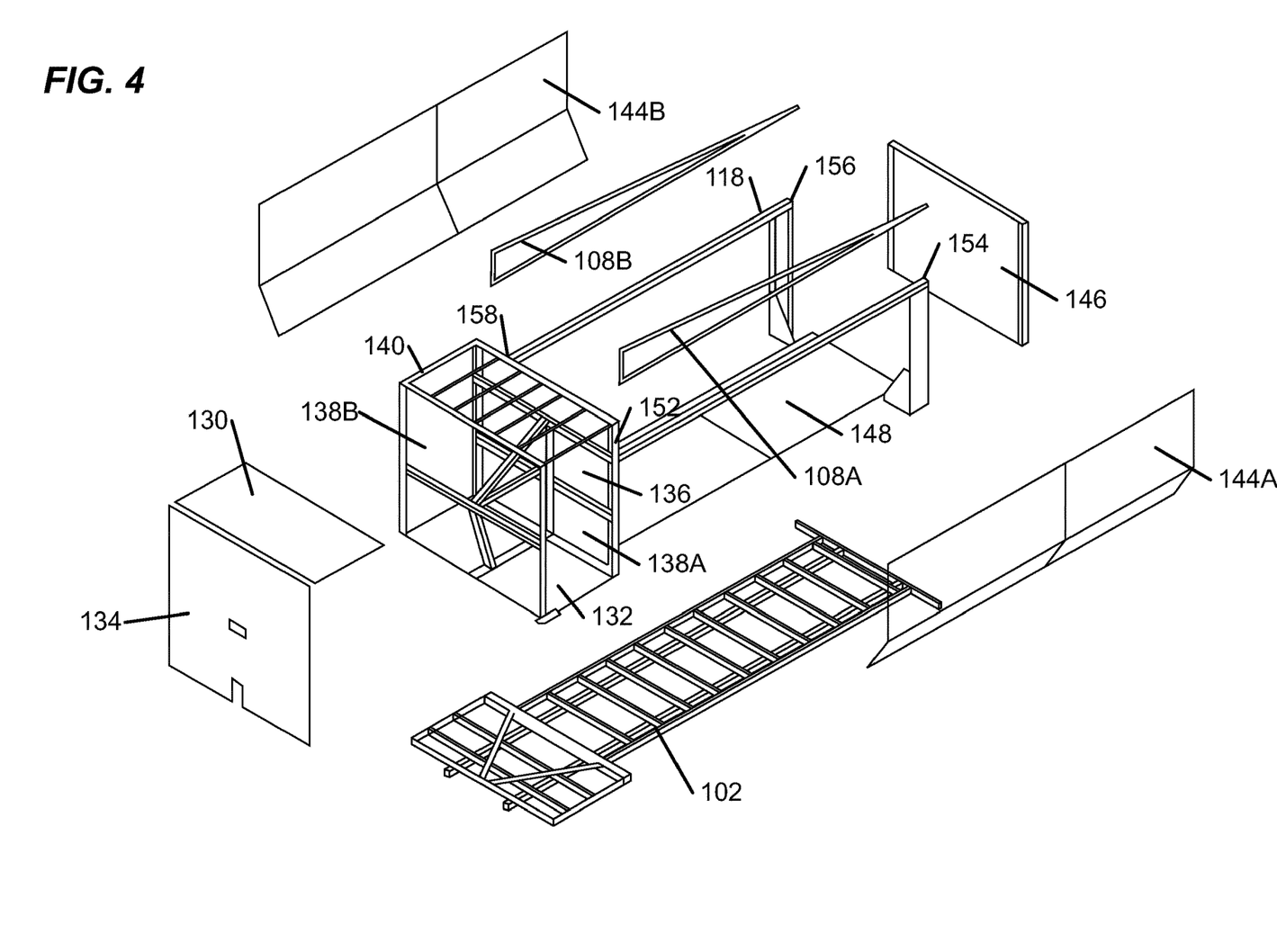
FIG. 4 is an exploded, perspective view of a combination dumpster, in accordance with an embodiment of the disclosure.
Figure 5:
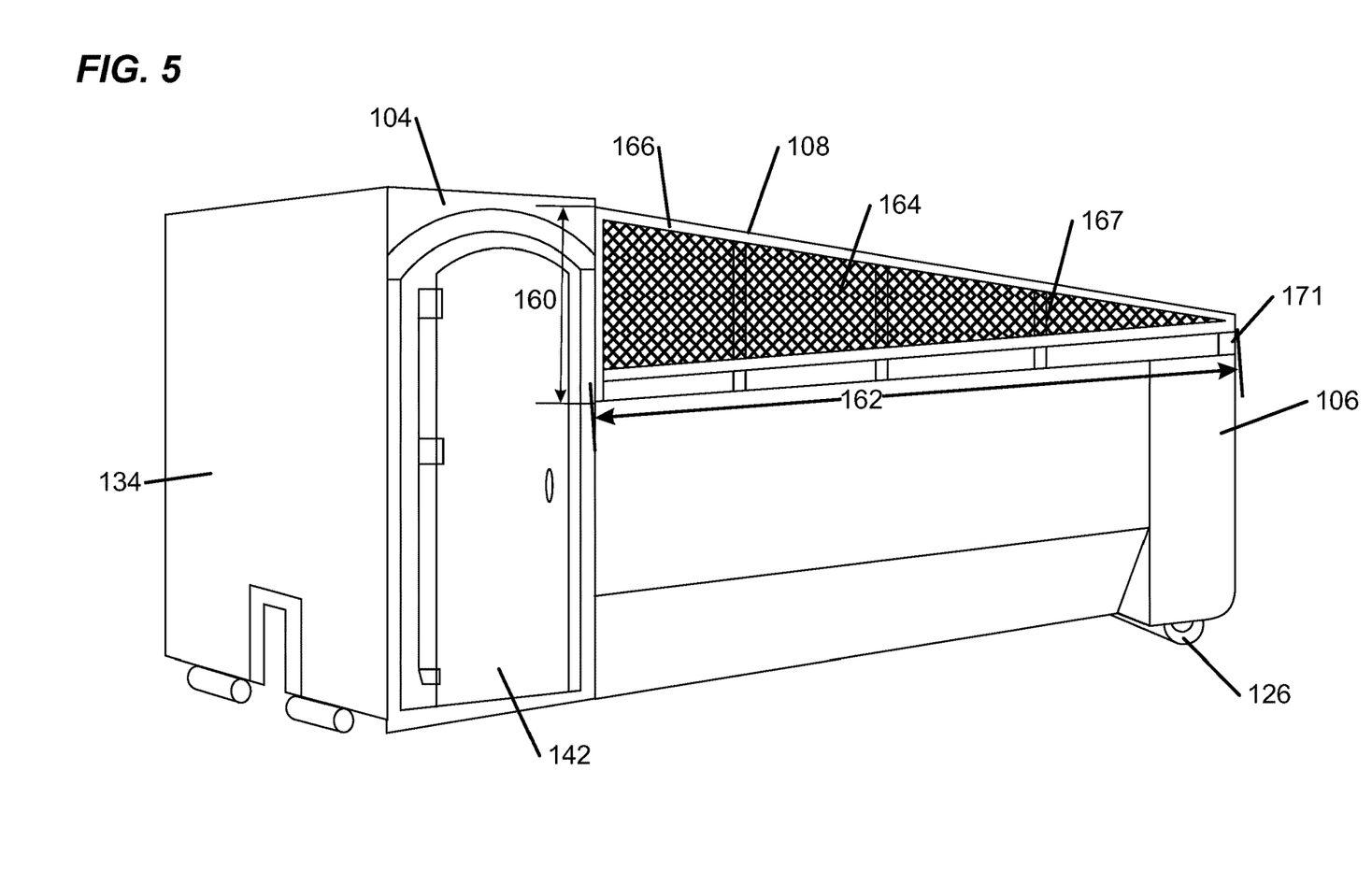
FIG. 5 is a perspective view of a combination dumpster including a sidewall extension, in accordance with an embodiment of the disclosure.
Figure 6:
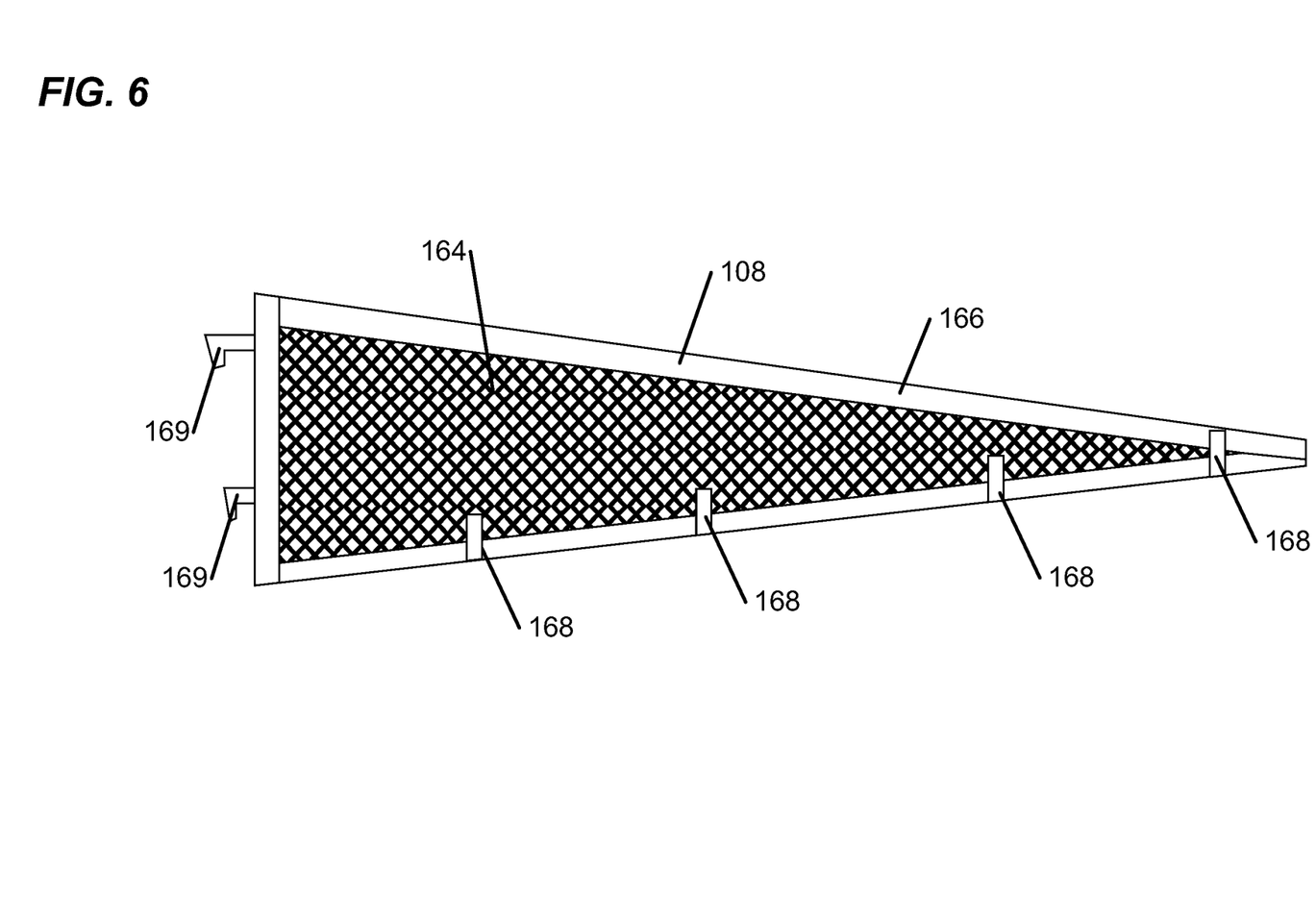
FIG. 6 is a perspective view of a sidewall extension, in accordance with an embodiment of the disclosure.

With additional reference to FIGS. 4-6, construction details of the combination dumpster 110 and sidewall extensions 108A, 108B are depicted in accordance with embodiments of the disclosure. In embodiments, the chassis 102 can be common to both the toilet housing portion 104 and the dumpster portion 106. To facilitate ease and movement of the combination dumpster 110, in some embodiments, the chassis 102 can be equipped with one or more rollers or casters 126.

The toilet housing portion 104 can be bounded by a top panel 130, a bottom panel 132, a front panel 134, a common end panel 136 (e.g., positioned between the toilet housing portion 104 and the dumpster portion 106), with the left and right sides 138A, 138B remaining open for toilet access. In some embodiments, the panels can be held together with a framework 140, which in some embodiments can include an upper framework, a lower framework, and a plurality of corner posts. Alternatively, the toilet housing portion 104 can be formed or fabricated with an internal or integrated framework.

In embodiments, a portable toilet 142 can be secured within the toilet housing portion 104 by locking a chain around the toilet housing portion 104, thereby inhibiting removal of the portable toilet 142 from the toilet housing portion 104. Alternatively, the toilet housing portion 104 can be equipped with one or more lock bars (not shown) for detachably locking the portable toilet 142 to the toilet housing portion 104. In an alternative embodiment, the portable toilet 142 can be integrally fabricated as part of the combination dumpster 110.

The dumpster portion 106 can be bound by side panels 144A, 144B, a free end panel 148, and the common end panel 136. Collectively the panels 136, 144A, 144B, and 148 can be framed by four corners 152, 154, 156, 158 to define the top opening 118. In embodiments, a bottom of the dumpster portion 106 can be defined by a bottom panel 146, which can be positioned on the chassis 102. In some embodiments, the free end panel 148 can be supported by a separate framework mounted on hinges to allow the free end panel 148 to swing away from the end of the dumpster portion 106 to facilitate loading and unloading.

With additional reference to FIGS. 5-6, each sidewall extension 108 can generally be formed to resemble a right triangle, having a vertical side 160 corresponding to a height differential between the toilet housing portion 104 and the dumpster portion 106, and a base side 162 extending along a length of the dumpster portion 106, wherein the sidewall extension 108 generally serves to fill the void created by the height differential between the dumpster portion 106 and the toilet housing portion 104 to redefine a top opening 118 of the dumpster portion 106. Although various lengths of the vertical side 160 are contemplated, a sidewall extension 108 for a 20 cubic yard dumpster can measure about 3 feet in length, and a sidewall extension 108 for a 830 cubic yard dumpster can measure about 2 feet in length.

Although the sidewall extension 108 is depicted generally having a triangular-shaped configured to fill the void created by the height differential between the dumpster portion and the toilet housing, other sidewall extension shapes are also contemplated. For example, in one embodiment, the sidewall extension 108 can be substantially rectangular, generally configured to extend the walls of the dumpster portion 106 to the height of the toilet housing portion 104.

Although various methods of constructing the sidewall extensions 108 are contemplated, in some embodiments, each sidewall extension 108 can be comprised of wall 164 supported by a frame 166. In some embodiments, the wall 164 can be constructed of an expanded metal gauge material. In some embodiments, the frame 166 can be constructed of at least one of angle iron or other extruded member (e.g., channel iron, I-beams, square or rectangular tubing, T-bar, etc.). As depicted in FIG. 5, in some embodiments, the frame 166 can extend around a perimeter of the sidewall extension 108, and additionally include one or more crossbeams 167 to which the wall 164 can be affixed.

In some embodiments, the frame 166 can be operably coupled to the top opening 118 of the dumpster portion 106, via one or more feet 171, which can be configured to couple to (e.g., be inserted into a corresponding slot) or otherwise be operably coupled to the dumpster portion 106. In other embodiments, such as that depicted in FIG. 6, the frame 166 can be operably coupled to the top opening 118 of the dumpster portion 106, for example via one or more fasteners 168 (e.g., screw, bolt, pin, clamp, etc.), which can be configured to pass through an aperture defined in the frame 166 and/or dumpster portion. In some embodiments, the fasteners 168 can be self-tapping lag screws for ease of installation. Further, in some embodiments, the frame 166 can include one or more hooks 169 configured to correspondingly mate with a portion of the frame 140.

Accordingly, in some embodiments, the sidewall extension 108 can be operably coupled to the dumpster portion 106 by first inserting the hooks 169 and corresponding apertures defined by the frame 140, then by installing one or more fasteners 168 to further couple the frame 166 to the dumpster portion 106. In some embodiments, the sidewall extensions 108 can be selectively removed from the dumpster portion 106 as required. Further, in some embodiments, the sidewall extensions 108 can include one or more hooks or anchors, designed to engage with corresponding fasteners on the tarp 114, ensuring a secure fit and full coverage when the tarp 114 is extended in the covered position (as depicted in FIG. 1).

In operation, the combination dumpster 110 is placed on the transportation vehicle 120 and delivered to the use location, such as a construction site or renovation project. Upon arrival, the combination dumpster 110 is positioned at a convenient and accessible location using the hoist mechanism 122, ensuring stability and ease of access for users. The portable toilet 142 within the toilet housing portion 104 provides essential sanitation facilities for workers on-site, while the dumpster portion 106 serves as a centralized receptacle for the collection of refuse and construction debris.

As work progresses and the dumpster portion 106 begins to fill, the sidewall extensions 108A, 108B play a role in increasing the containment capacity, preventing overflow and maintaining a neat and safe environment, ensuring that even when the waste reaches a level flush with the top of the toilet housing portion 104, all waste remains securely contained within the boundaries of the dumpster portion 106.

Once the project is completed or when the dumpster portion 106 requires emptying, the combination dumpster 110 is hoisted onto the transportation vehicle 120 using the hoist mechanism 122. When it becomes necessary to cover the dumpster portion 106, for instance, at the end of the day or during transport to prevent the escape of debris and to secure the contents against unauthorized access, the roll-off tarp system 112 is deployed.

An operator activates the lever arm mechanism 124, possibly with the assistance of the motorized actuator, to smoothly extend the tarp 114 from the spool 116 across the top opening 118 of the dumpster portion 106. The tarp 114, designed to accommodate the form of the combination dumpster 110, including the toilet housing portion 104 and the extended sides created by the sidewall extensions 108A, 108B, provides comprehensive coverage. The waste removal system 100 can then transported to a designated waste disposal or recycling facility, where the contents of the dumpster portion 106 are safely offloaded.

Figure 8:
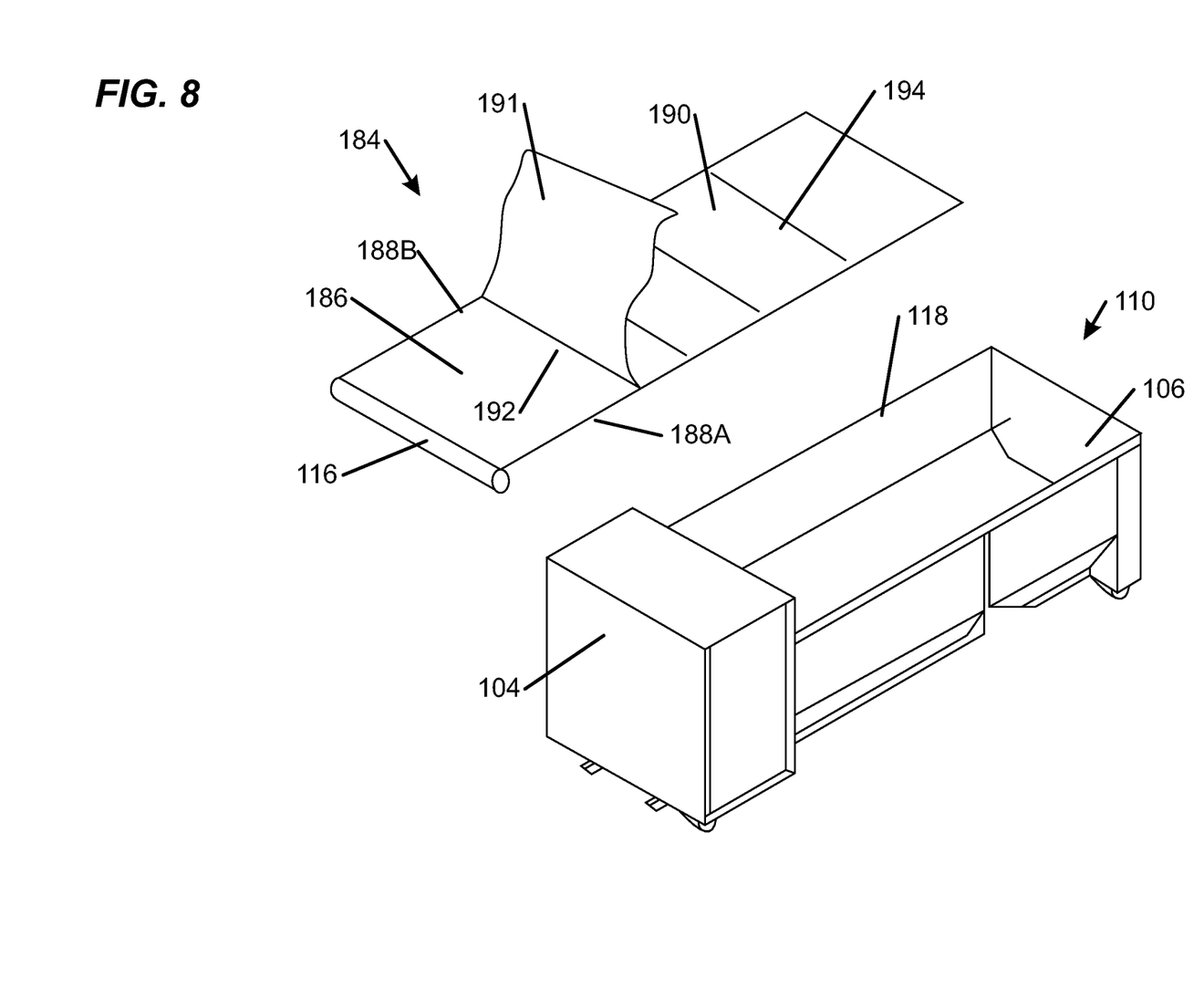
FIG. 8 is a perspective view of a combination dumpster and cover including a toilet housing window, in accordance with an alternative embodiment of the disclosure.
Figure 9:
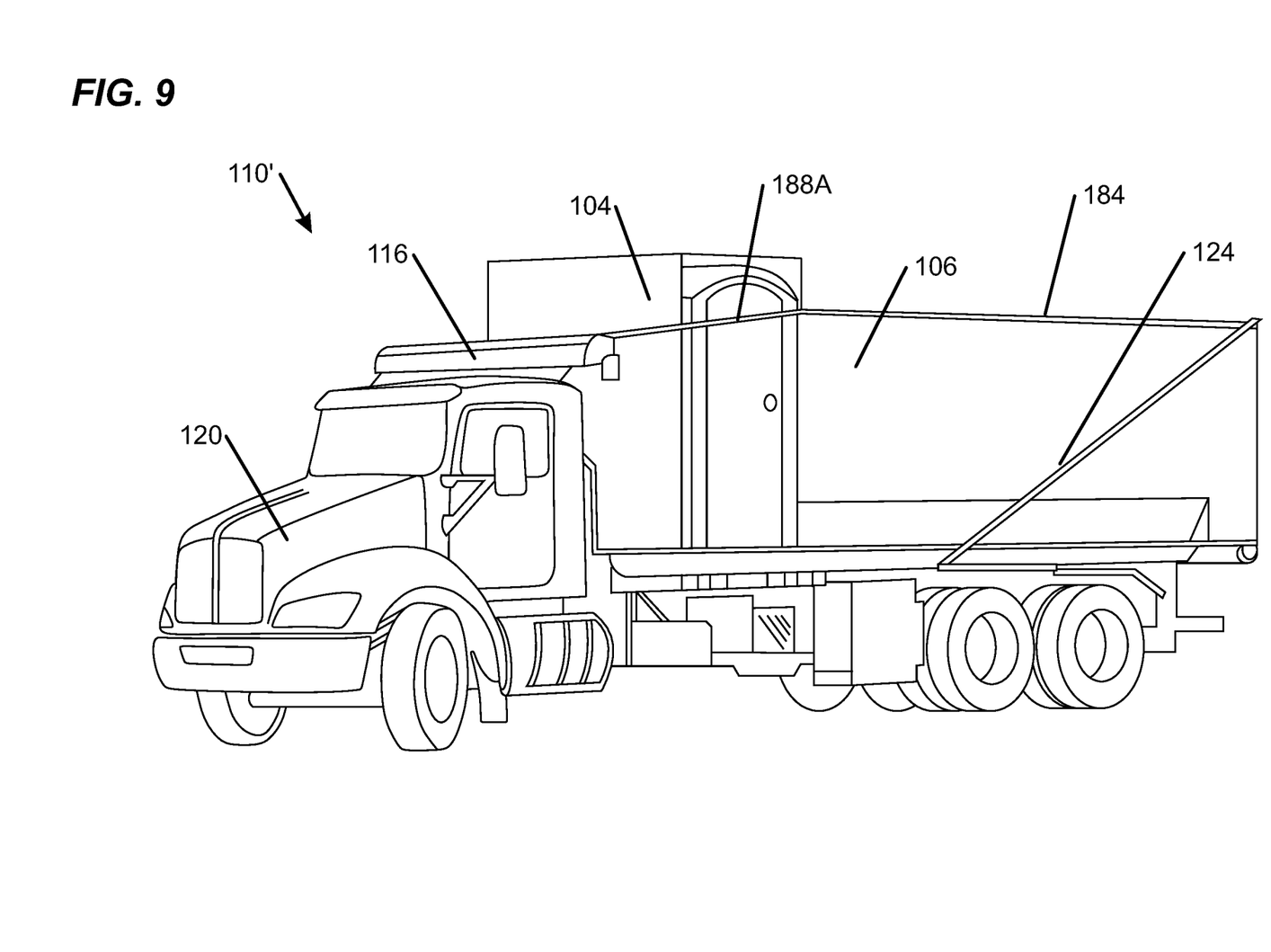
FIG. 9 is a perspective view of a waste removal system having a cover defining a toilet housing window in the closed configuration, in accordance with an alternative embodiment of the disclosure.

With additional reference to FIGS. 8-9, an alternative embodiment of the waste removal system 100', is depicted in accordance with an embodiment of the disclosure. This embodiment, while retaining many features of the embodiment presented in FIGS. 1-7, introduces a novel approach to accommodating securement of the cover. Instead of using sidewall extensions, this embodiment employs a specially designed tarp 184. The tarp 184 incorporates a window 186, shaped and sized to allow a section of the toilet housing portion 104 to protrude therethrough, thereby enabling a remainder of the tarp 184 to lie substantially flat across the top opening 118 of the dumpster portion 106.

In embodiments, tarp 184 can be reinforced by a pair of straps 188A, 188B, or similar sturdy fabric elements, extending along a length of the tarp 184. The straps 188A, 188B can add structural integrity, while also playing role in defining the window 186. A fabric panel 190, shaped and sized to cover the top opening 118 of the dumpster portion 106, can be securely attached to the straps 188A, 188B. Accordingly, the tarp 184, with its integral window 186, can be wound around the spool 116, such that the window 186 is framed by the straps 188A, 188B on the sides, with the spool 116 at the front and the rear edge 192 of the fabric panel 190 defining its boundaries.

In some embodiments, the integral window 186 can be selectively opened and closed through manipulation of a fabric panel flap 191, which can be secured in either of an open configuration (exposing the integral window 186) or a closed configuration (closing the integral window 186). For additional support, in some embodiments, one or more reinforcements 194 (e.g., stiffening rods, reinforced fabric, etc.) can be incorporated into the fabric panel 190, to ensure that the fabric panel 190 remains substantially flat to cover the top opening 118 of the combination dumpster 110 in the covered configuration.

In some embodiments, the spool 116 can be mounted to a portion of the transport vehicle 120. For example, in some embodiments, the spool 116 can be mounted to a cab or other portion of the transport vehicle forward of the combination dumpster 110 on an actuator configured to vertically raise and lower the spool as the roll-off tarp system 112 is activated. In other embodiments, the spool 116 can be mounted on the lever arm mechanism 124. In embodiments where the spool is mounted to the lever arm mechanism 124 enables the window 186 portion of the tarp 184 to be unrolled before the fabric panel 190, making it easier to don and doff the tarp 184, as positioning the spool on the lever arm mechanism 124 generally reduces instances where the rear edge 192 catches on an edge of the portable toilet 142.

In operation, to deploy the tarp 184, the operator engages the roll-off tarp system, possibly utilizing a lever arm mechanism similar to that described in the previous embodiment. As the tarp 184 unfurls from the spool 116, the window 186 aligns with the toilet housing portion 104, allowing it to pass through without obstruction. The remainder of the tarp 184 extends over and covers the top opening 118 of the dumpster portion 106, effectively securing the contents within.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

Various embodiments of the present disclosure will be described in detail with reference to the drawings, where like reference numerals represent like parts and assemblies throughout the several views. Reference to various embodiments does not limit the scope of the invention, which is limited only by the scope of the claims attached hereto. Additionally, any example set forth in the specification is not intended to be limiting and merely sets forth some of the many possible embodiments for the claimed invention.

What is claimed is:
1. A waste removal system comprising:
   a dumpster and portable toilet system comprising:
      a chassis;
      a dumpster portion attached to the chassis, wherein the dumpster portion includes an enclosure adapted for receiving refuse;
      a toilet housing portion attached to the chassis, wherein the toilet housing portion includes a recess adapted to receive a portable toilet, the toilet housing portion extending above a height of the dumpster portion creating a height differential between the dumpster portion and the toilet housing portion;
      a pair of triangular sidewall extensions attached to respective sides of the dumpster portion, each sidewall extension having a right triangular shape with a vertical side corresponding to the height differential and a base side extending along a length of the dumpster portion, wherein the pair of triangular sidewall extensions fill a void created by the height differential between the dumpster portion and the toilet housing portion to define a top opening of the dumpster portion; and
   a roll-off tarp system comprising:
      a spool mounted anterior to the dumpster and portable toilet system;
      a tarp wound around the spool, the tarp being of sufficient size to cover a top of the toilet housing portion and the top opening of the dumpster portion defined by the pair of triangular sidewall extensions, and;

a lever arm mechanism connected to the spool, adapted to extend the tarp from the spool, over the toilet housing portion and dumpster portion, from front to back.

2. The waste removal system of claim 1, wherein each sidewall extension comprises an expanded gauge metal wall.

3. The waste removal system of claim 1, wherein each sidewall extension comprises an angle iron frame.

4. The waste removal system of claim 3, wherein the angle iron frame of each sidewall extension is bolted to a top edge of the dumpster portion.

5. The waste removal system of claim 1, wherein the pair of triangular sidewall extensions are detachable, allowing for their removal and attachment as required.

6. The waste removal system of claim 1, wherein the pair of triangular sidewall extensions includes a plurality of hooks or anchors, designed to engage with corresponding fasteners on the tarp, ensuring a secure fit and full coverage when the tarp is extended.

7. The waste removal system of claim 1, wherein the lever arm mechanism includes a motorized actuator to automate the extension and retraction of the tarp.

8. The waste removal system of claim 1, further comprising a transportation vehicle including a hoist mechanism for engaging the dumpster and portable toilet system, facilitating the placement of the system onto the transportation vehicle and the removal of the system from the transportation vehicle, wherein the hoist mechanism is adapted to operate with the dumpster and portable toilet system when the tarp is extended over the system by the roll-off tarp system.

9. The waste removal system of claim 1, wherein the chassis further comprises rollers or casters mounted thereto for positioning or moving the dumpster and portable toilet system.

10. The waste removal system of claim 1, wherein the portable toilet is at least one of removable mounted in the toilet housing portion or integrally fabricated in the toilet housing portion.

\* \* \* \* \*